(12) United States Patent
Teramoto et al.

(10) Patent No.: US 11,312,242 B2
(45) Date of Patent: Apr. 26, 2022

(54) ELECTRIC ROLLING STOCK CONTROL DEVICE

(71) Applicant: MITSUBISHI ELECTRIC CORPORATION, Tokyo (JP)

(72) Inventors: Kota Teramoto, Tokyo (JP); Shinsuke Kadoi, Tokyo (JP); Sho Kato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/068,556

(22) PCT Filed: Jan. 13, 2016

(86) PCT No.: PCT/JP2016/050842
§ 371 (c)(1),
(2) Date: Jul. 6, 2018

(87) PCT Pub. No.: WO2017/122296
PCT Pub. Date: Jul. 20, 2017

(65) Prior Publication Data
US 2019/0039460 A1 Feb. 7, 2019

(51) Int. Cl.
*H02P 6/20* (2016.01)
*B60L 9/18* (2006.01)
(Continued)

(52) U.S. Cl.
CPC ............... *B60L 9/18* (2013.01); *B60L 15/20* (2013.01); *H02P 6/18* (2013.01); *H02P 27/08* (2013.01);
(Continued)

(58) Field of Classification Search
CPC .... B60L 9/18; B60L 15/20; H02P 6/18; H02P 27/08
(Continued)

(56) References Cited

U.S. PATENT DOCUMENTS 4,599,547 A * 7/1986 Ho .................. G05B 19/39
318/591
5,210,690 A * 5/1993 Kageyama ........... B60T 8/1764
303/163
(Continued)

FOREIGN PATENT DOCUMENTS

JP 2003-259699 A 9/2003
JP 2003-324998 A 11/2003
(Continued)

OTHER PUBLICATIONS

Office Action (Notification of Reasons for Refusal) dated Sep. 4, 2018, by the Japan Patent Office in corresponding Japanese Patent Application No. 2017-561441 and English translation of the Office Action. (7 pages).
(Continued)

*Primary Examiner* — Muhammad S Islam
*Assistant Examiner* — Zemenay T Truneh
(74) *Attorney, Agent, or Firm* — Buchanan Ingersoll & Rooney PC

(57) ABSTRACT

An electric rolling stock control device includes a voltage controlling unit for controlling an output voltage of an inverter and a speed estimating unit for calculating a rotation speed estimation value of an electric motor. The speed estimating unit includes an initial speed estimating unit for outputting an initial speed estimation value, a steady speed estimating unit for outputting a steady speed estimation value, a correction coefficient calculating unit for calculating a correction coefficient based on the steady speed estimation value and a backup speed, and a correction speed calculating unit for storing the correction coefficient in a storage unit and calculating a correction speed by multiplying the correction coefficient by the backup speed.

11 Claims, 6 Drawing Sheets

(51) Int. Cl.
*H02P 6/18* (2016.01)
*B60L 15/20* (2006.01)
*H02P 27/08* (2006.01)
*H02P 6/17* (2016.01)

(52) U.S. Cl.
CPC ....... *B60L 2200/26* (2013.01); *B60L 2240/12* (2013.01); *B60L 2240/427* (2013.01); *H02P 6/17* (2016.02)

(58) Field of Classification Search
USPC ........................................................ 318/812
See application file for complete search history.

(56) References Cited

U.S. PATENT DOCUMENTS

| | | | | |
|---|---|---|---|---|
| 5,320,421 | A * | 6/1994 | Kade | B60T 8/4266 303/115.2 |
| 6,434,988 | B1 * | 8/2002 | Suzuki | B21H 1/06 72/105 |
| 6,791,293 | B2 * | 9/2004 | Kaitani | H02P 6/18 318/590 |
| 7,117,014 | B1 * | 10/2006 | Van Rensburg | H04B 7/0695 455/561 |
| 2004/0036441 | A1 * | 2/2004 | Inazumi | H02P 21/18 318/807 |
| 2012/0280641 | A1 * | 11/2012 | Lejeune | H02P 21/16 318/400.09 |
| 2014/0368137 | A1 | 12/2014 | Taniguchi et al. | |
| 2015/0051846 | A1 * | 2/2015 | Masuya | G01M 13/04 702/34 |

FOREIGN PATENT DOCUMENTS

| | | |
|---|---|---|
| JP | 2005-312126 A | 11/2005 |
| JP | 2013-183532 A | 9/2013 |

OTHER PUBLICATIONS

International Search Report (PCT/ISA/210) dated Mar. 29, 2016, by the Japanese Patent Office as the International Searching Authority for International Application No. PCT/JP2016/050842.

Written Opinion (PCT/ISA/237) dated Mar. 29, 2016, by the Japanese Patent Office as the International Searching Authority for International Application No. PCT/JP2016/050842.

Office Action dated Dec. 30, 2019, by the India Patent Office in corresponding India Patent Application No. 201847023371 and English translation of the Office Action. (5 pages).

Hearing Notice issued on Dec. 9, 2021, in corresponding India Patent Application No. 201847023371, with English translation. (3 pages).

* cited by examiner

ELECTRIC ROLLING STOCK CONTROL DEVICE

FIELD

The present invention relates to an electric rolling stock control device which controls a power converter for supplying power to an electric motor that drives an electric rolling stock without a sensor.

BACKGROUND

Patent Literature 1 discloses an electric rolling stock control device including a car speed frequency converter which uses an output of a car speed sensor permanently installed in a vehicle of the electric rolling stock as a backup speed (definition of "backup speed" will be described later) and converts the output into a rotation frequency of an induction motor and a limiter which prevents an estimation value of a rotor rotation frequency of a rotor rotation frequency calculation unit from departing from a control range based on an output from the car speed frequency converter.

According to the electric rolling stock control device disclosed in Patent Literature 1, the limiter can prevent the estimation value of the rotor rotation frequency from departing from the control range. Therefore, instability of control in a process from coasting of the electric rolling stock to restart is eliminated, and driving characteristics with high stability and high reliability can be obtained.

CITATION LIST

Patent Literature

Patent Literature 1: Japanese Patent Application Laid-Open No. 2003-324998

SUMMARY

Technical Problem

However, the electric rolling stock control device disclosed in Patent Literature 1 has a system using the backup speed even though the electric rolling stock control device performs sensorless control. The electric rolling stock control device has had a problem in that when an error between the backup speed and an actual speed (referred to as "actual motor speed" below) of the electric motor for driving the electric rolling stock (appropriately referred to as "motor" below) increases, limit processing of an estimated speed originally performed to improve reliability of speed estimation prevents accurate speed estimation, and this causes deterioration in accuracy of the speed estimation.

The present invention has been made in view of the above. An object of the present invention is to obtain an electric rolling stock control device capable of suppressing deterioration in accuracy of speed estimation even with a system using a backup speed.

Solution to Problem

To solve the above problem and achieve the object, an electric rolling stock control device for controlling a power converter that supplies power to an electric motor for driving an electric rolling stock without a sensor according to the present invention includes: a voltage controlling unit that controls an output voltage of the power converter; and a speed estimating unit that calculates a rotation speed estimation value of the electric motor. The speed estimating unit includes: an initial speed estimating unit that outputs an initial speed estimation value; a steady speed estimating unit that outputs a steady speed estimation value; a correction coefficient calculating unit that calculates a correction coefficient based on the steady speed estimation value and a backup speed that is speed information from outside that is stored in a set of electric rolling stocks; and a correction speed calculating unit that stores the correction coefficient in a storage unit and calculates a correction speed by multiplying the correction coefficient by the backup speed.

Advantageous Effects of Invention

According to the present invention, an effect to suppress deterioration in accuracy of speed estimation even with a system using a backup speed can be obtained.

DESCRIPTION OF EMBODIMENTS

Figure 1:
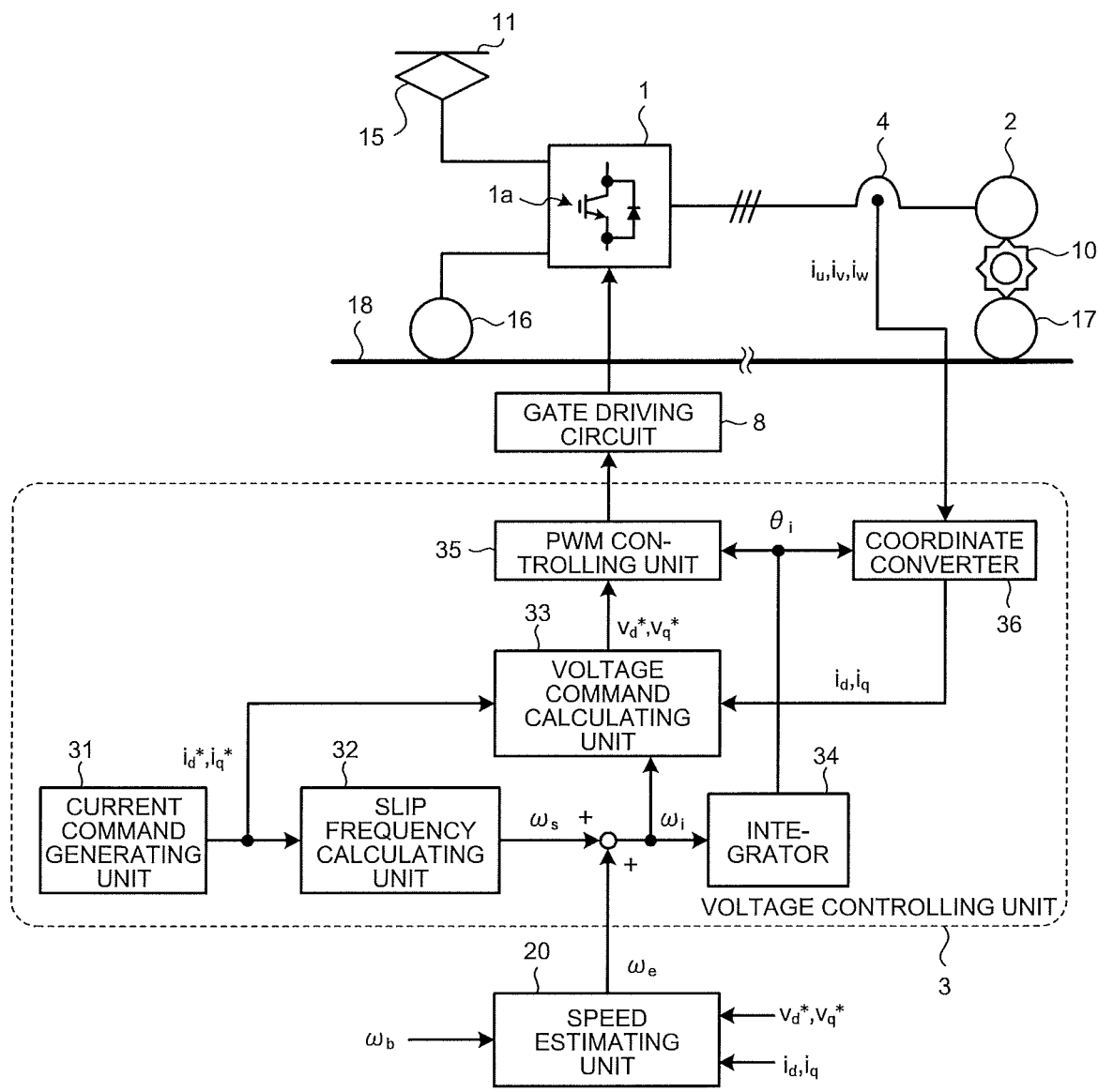
FIG. 1 is a configuration diagram of an overall system including an electric rolling stock control device according to the present embodiment.

First, before starting to describe the electric rolling stock control device according to the present embodiment, meanings of major terms used herein will be clarified.

(Backup Speed)

A backup speed is a speed obtained from a car speed sensor permanently installed in a vehicle of an electric rolling stock. As the car speed sensor, a Pulse Generator (PG) sensor attached to a non-driving wheel of the vehicle referred to as a trailing wheel is generally used. Speed information obtained by the PG sensor is stored by a train information managing system for managing train information as speed information of a set of electric rolling stocks, and the speed information is used for an operation or security of the train. From the viewpoint of the electric rolling stock control device, the backup speed is positioned as speed information obtained from the outside. Since wheel diameters of the trailing wheel and a driving wheel which is a main driving wheel are different from each other, strictly speaking, the backup speed does not necessarily coincide with a rotation speed of the motor (appropriately referred to as "motor speed" below). Therefore, the backup speed is not sufficient to control the motor speed with high accuracy, and the motor is controlled by estimating a speed by additionally detecting a current flowing in the motor (appropriately referred to as "motor current" below). In some cases, the car speed sensor is attached to the driving wheel to directly detect the speed of the driving wheel. This method is referred to as a sensor control method. A method to which the present invention is applied is a method which does not directly detect the speed of the driving wheel and is referred to as a sensorless control method.

(Steady Speed Estimation)

In the sensorless control method, a steady speed estimation is a processing or a method of estimating the motor speed by using a voltage command of the motor and the motor current obtained from a current sensor. When an inverter for driving the motor is gating on and is continuously in a power running state or a regenerative state, an algorithm sequence for steady speed estimation is applied. The term "steady" is used to distinguish the term from "initial speed estimation" described below.

(Initial Speed Estimation)

When the electric rolling stock is in a coasting state, the inverter is in a gate-off state. When the inverter is restarted from this state, it is necessary to gate on the inverter while adjusting an output voltage frequency of the inverter to be equal to the motor speed. During coasting, since the motor is not excited and the speed cannot be estimated, an algorithm sequence for the initial speed estimation is prepared to restart the inverter so as not to generate overcurrent and the like.

(Wheel Diameter Error)

Since the driving wheel may idly rotate when power is transmitted to a rail, wear of the driving wheel is increased. However, the wear of the trailing wheel is less than that of the driving wheel. In addition, maintenance for cutting the wheels may be performed so as not to cause a difference between diameters of the wheels of the single vehicle. For these reasons, the difference between the diameters, that is, the wheel diameter error is caused in the wheels of the set of the vehicles.

Hereinafter, the electric rolling stock control device according to the embodiment of the present invention will be described in detail with reference to the drawings. The present invention is not limited to the embodiment below. In the following description, a case where an electric motor is an induction motor will be described as an example. However, it goes without saying that main parts of the present invention can be applied to a synchronous electric motor.

FIG. 1 is a configuration diagram of an overall system including the electric rolling stock control device according to the present embodiment. In FIG. 1, the electric rolling stock control device according to the present embodiment includes a voltage controlling unit 3, a gate driving circuit 8, and a speed estimating unit 20. The gate driving circuit 8 generates a gate driving signal for driving a switching element 1a of an inverter 1 which is a component of the electric rolling stock and outputs the signal to the inverter 1. The voltage controlling unit 3 generates a PWM signal for performing Pulse Width Modulation (PWM) control on the inverter 1, which is a power converter, and outputs the PWM signal to the gate driving circuit 8. The speed estimating unit 20 generates a speed estimation value $\omega_e$ which is a rotation speed estimation value of an electric motor 2 using a backup speed $\omega_b$ and outputs the value to the voltage controlling unit 3.

Next, the electric rolling stock will be described. A high-potential-side connection end of the inverter 1 is electrically connected to an overhead contact line 11 via a pantagraph 15, and a low-potential-side connection end of the inverter 1 is electrically connected to a rail 18 via a wheel 16. The inverter 1 is a power converter which converts a direct current to an alternate current with a variable voltage and a variable frequency. An AC-side of the inverter 1 is connected to the electric motor 2 which is an induction motor. The inverter 1 drives the electric motor 2. The electric motor 2 drives a driving wheel 17 coupled to the electric motor 2 via a gear 10 to apply a driving force to the electric rolling stock. A current detector 4 is provided between the inverter 1 and the electric motor 2. The current detector 4 detects motor currents $i_u$, $i_v$, and $i_w$ which are phase currents flowing in the electric motor 2. The phase currents $i_u$, $i_v$, and $i_w$ detected by the current detector 4 are input to the voltage controlling unit 3. In FIG. 1, a DC electric rolling stock is illustrated as an example. However, it goes without saying that the present invention can be applied to an AC electric rolling stock.

A detailed configuration of the voltage controlling unit 3 is illustrated in FIG. 1. As illustrated in FIG. 1, the voltage controlling unit 3 according to the present embodiment includes a current command generating unit 31, a slip frequency calculating unit 32, a voltage command calculating unit 33, an integrator 34, a PWM controlling unit 35, and a coordinate converter 36.

The coordinate converter 36 converts the motor currents $i_u$, $i_v$, and $i_w$ detected by the current detector 4 into two axes of a dq-axis rotational coordinate system and calculates a d-axis current $i_d$ and a q-axis current $i_q$. Here, the d-axis and the q-axis are respectively referred to as a magnetic flux axis and a torque axis, and both axes are orthogonal to each other in terms of vectors.

The current command generating unit 31 calculates a q-axis current command $i_q^*$ which is a torque axis current command and a d-axis current command $i_d^*$ which is a magnetic flux axis current command based on a magnetic flux command $\Phi^*$ and a torque command $T_m^*$ according to the following formulas (1) and (2).

$$i_d^* = \Phi^*/M \quad (1)$$

$$i_q^* = (L2 \times T_m^*)/(M \times \Phi_m^*) \quad (2)$$

In the formulas (1) and (2), the reference character M indicates a mutual inductance, and the reference character L2 indicates a secondary inductance.

The slip frequency calculating unit 32 calculates a slip frequency $f_s$ to be applied based on the d-axis current command $i_d^*$ and the q-axis current command $i_q^*$ output from the current command generating unit 31 according to the formula (3). In the example in FIG. 1, to be corresponded to an output from the speed estimating unit 20 to be described later, a slip speed $\omega_s$ obtained by multiplying the slip frequency $f_s$ by $2\pi$ is output.

$$f_s = (R2 \times i_q^*)/(2\pi \times L2 \times i_d^*) \quad (3)$$

In the formula (3), the reference character R2 indicates a secondary resistance, and the reference character L2 indicates a secondary inductance.

According to the formulas (4) and (5), the voltage command calculating unit 33 receives the d-axis current command $i_d^*$ and the q-axis current command $i_q^*$ calculated by the current command generating unit 31, the d-axis current $i_d$ and the q-axis current $i_q$ output from the coordinate converter 36, an angular frequency $\omega_i$ generated by the voltage controlling unit 3 and used in the voltage controlling unit 3 as inputs and calculates a d-axis voltage command $v_d^*$ and a q-axis voltage command $v_q^*$ based on these inputs. The angular frequency $\omega_i$ will be described later in detail.

$$v_d^* = R1 \times i_d^* - \omega_i \times \sigma \times L1 \times i_q^* + (K_p + K_i/s) \times (i_d^* - i_d^*) \quad (4)$$

$$v_q^* = R1 \times i_q^* + \omega_i \times \sigma \times L1 \times i_d^* + (K_p + K_i/s) \times (i_q^* - i_q^*) \quad (5)$$

In the formulas (4) and (5), the reference character R1 indicates a primary resistance, the reference character L1 indicates a primary inductance, and the reference character L2 indicates a secondary inductance. Furthermore, the reference character $K_p$ indicates a current control proportional gain, and the reference character $K_i$ indicates a current control integral gain. In addition, the reference character $\sigma$ is a leakage inductance indicated by the following formula (6).

$$\sigma = 1 - (M \times M)/(L1 \times L2) \quad (6)$$

The integrator 34 calculates a phase $\sigma_i$ by integrating an input angular frequency $\omega_i$. As illustrated in FIG. 1, the angular frequency $\omega_i$ can be generated by adding the slip speed $\omega_s$ and the speed estimation value $\omega_e$ generated by the speed estimating unit 20 to be described later in detail.

Based on the phase $\theta_i$ calculated by the integrator 34 and the d-axis voltage command $v_d^*$ and the q-axis voltage command $v_q^*$ calculated by the voltage command calculating unit 33, the PWM controlling unit 35 generates the PWM signal used to perform PWM control to the switching element 1a of the inverter 1.

Next, the speed estimating unit 20 will be described. The speed estimating unit 20 receives the d-axis voltage command $v_d^*$ and the q-axis voltage command $v_q^*$ calculated by the voltage command calculating unit 33, the d-axis current $i_d$ and the q-axis current $i_q$ which are outputs of the coordinate converter 36, and the backup speed $\omega_b$ as inputs and generates the speed estimation value $\omega_e$ of the electric motor 2 based on these inputs and outputs the generated value to the voltage controlling unit 3. As described above, the backup speed $\omega_b$ is input as the speed information of a train of electric rolling stocks. Speed information managed by a train information managing system which is not illustrated, speed information from a car speed sensor which is not illustrated attached to the trailing wheel, and the like are exemplified. In the following description, a case where the speed information from the car speed sensor attached to the trailing wheel is input will be described as an example.

Figure 2:
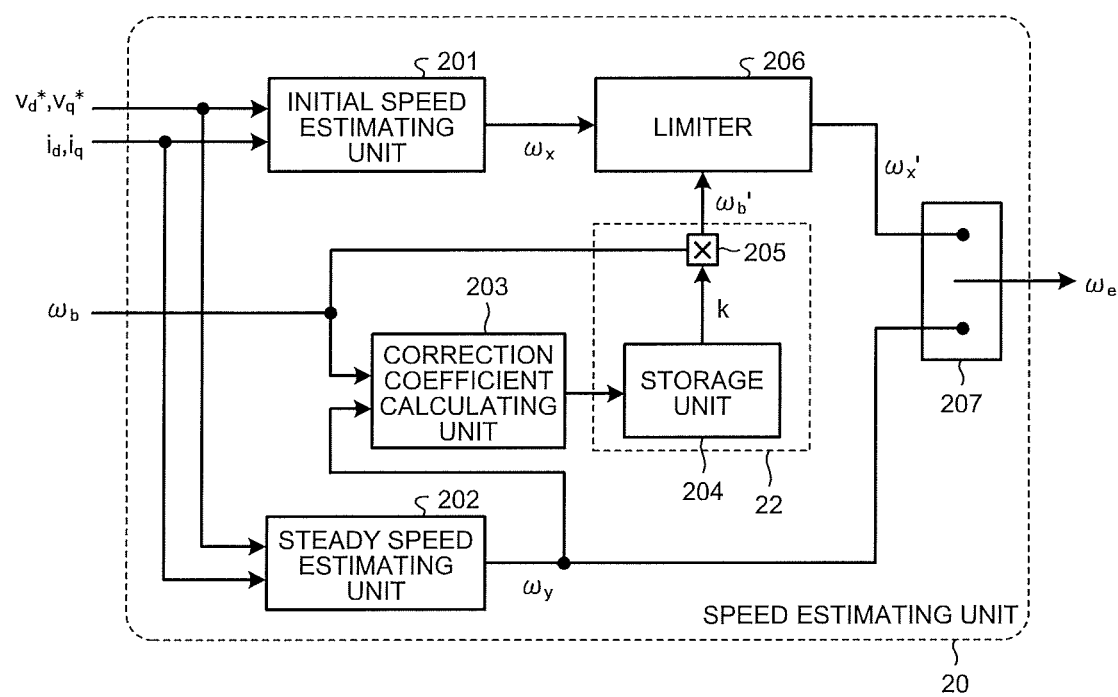
FIG. 2 is a block diagram illustrating a detailed configuration of a speed estimating unit according to the present embodiment.

FIG. 2 is a block diagram illustrating the detailed configuration of the speed estimating unit 20 illustrated in FIG. 1. As illustrated in FIG. 2, the speed estimating unit 20 according to the present embodiment includes an initial speed estimating unit 201, a steady speed estimating unit 202, a correction coefficient calculating unit 203, a storage unit 204, a multiplier 205, a limiter 206, and an output switch 207. The storage unit 204 and the multiplier 205 function as a correction speed calculating unit 22.

The initial speed estimating unit 201 receives the d-axis voltage command $v_d^*$, the q-axis voltage command $v_q^*$, the d-axis current $i_d$, and the q-axis current $i_q$ as inputs and estimates an initial speed estimation value $\omega_x$ based on these inputs. Note that a method for estimating the initial speed estimation value $\omega_x$ is well known, and the detailed description thereof will be omitted.

The steady speed estimating unit 202 receives the d-axis voltage command $v_d^*$, the q-axis voltage command $v_q^*$, the d-axis current $i_d$, and the q-axis current $i_q$ as inputs and estimates a steady speed estimation value $\omega_y$ based on these inputs. Note that a method for estimating the steady speed estimation value $\omega_y$ is well known, and the detailed description thereof will be omitted.

The correction coefficient calculating unit 203 receives the backup speed $\omega_b$ and the steady speed estimation value $\omega_y$ as inputs. The correction coefficient calculating unit 203 calculates a correction coefficient k and stores the correction coefficient k in the storage unit 204. The latest correction coefficient k is stored in the storage unit 204 and is output to the multiplier 205. A typical example of the correction coefficient k is a ratio between the steady speed estimation value $\omega_y$ and the backup speed $\omega_b$, that is, $\omega_y/\omega_b$ calculated as the correction coefficient k. Note that the correction coefficient k may be obtained by performing integration processing as described later. Furthermore, the correction coefficient calculating unit 203 does not need to calculate the correction coefficient k in real time, a calculation frequency of the correction coefficient k may be set to about once a day. Furthermore, since it can be considered that the wheel diameter of the driving wheel significantly changes in several days or weeks, the calculation frequency of the correction coefficient k may be set to the several days or weeks. The points of attention in a case where the train runs will be described later.

Returning back to the description of FIG. 2, the multiplier 205 outputs a value of $k\omega_b$ obtained by multiplying the backup speed $\omega_b$ by the correction coefficient k to the limiter 206 as a correction speed. In FIG. 2, the correction speed, which is a corrected backup speed, is represented by $\omega_b'$, and the relation between the backup speed $\omega_b$ and the correction speed $\omega_b'$ is indicated by $\omega_b' = k\omega_b$.

The limiter 206 receives the initial speed estimation value $\omega_x$ and the correction speed $\omega_b'$ as inputs and determines a threshold of the limiter 206 based on these inputs. Based on the determined threshold, the limiter 206 generates an initial speed estimation value $\omega_x'$ limited within a limit range. In the present embodiment, regarding the function of the limiter 206, a method disclosed in Patent Literature 1 is used. Detail of the processing is disclosed in Patent Literature 1. Therefore, detailed description thereof is omitted. All or a part of the contents disclosed in Patent Literature 1 are incorporated herein and forms a part of the present specification.

The output of the limiter 206, that is, the initial speed estimation value $\omega_x'$ and the steady speed estimation value $\omega_y$ limited within the limit range are input to the output switch 207. The output switch 207 selects one of the initial speed estimation value $\omega_x'$ and the steady speed estimation value $\omega_y$ limited within the limit range and outputs the selected value as the speed estimation value $\omega_e$.

Supplemental description regarding a part of the processing will be made. Since the correction coefficient k which is an output of the storage unit 204 can be obtained by the ratio of the steady speed estimation value $\omega_y$ and the backup speed $\omega_b$, even if there is no accurate wheel diameter information at the time of calculation, it is possible to lessen an influence of the wheel diameter error. Actually, if only standard wheel diameter information before cutting the wheel is input, even when the wheel wears when the train runs or the wheel is cut for maintenance, the value of the steady speed estimation value $\omega_y$ follows the wear or cut. Therefore, the correction coefficient is constantly updated to be appropriate.

Figure 3:
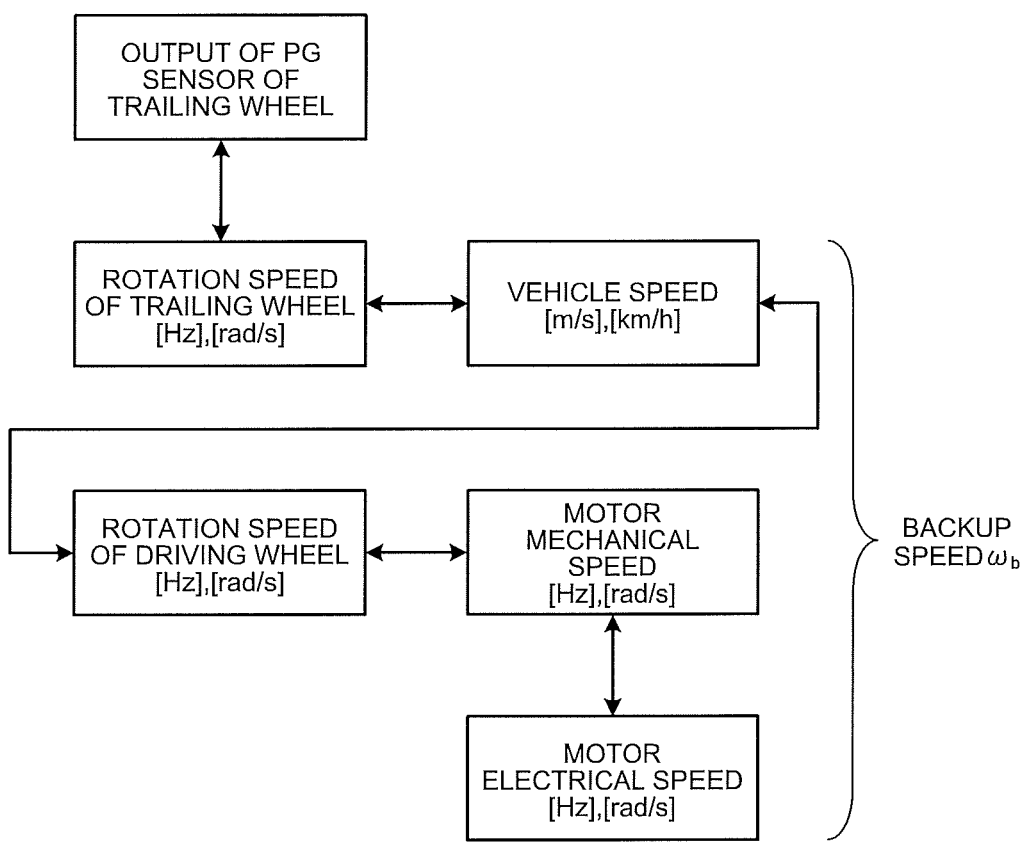
FIG. 3 is a diagram illustrating a transition of speed information used for control of an electric rolling stock or a display in the electric rolling stock.

Next, the meaning of the term "speed" will be described. FIG. 3 is a diagram illustrating a transition of information which includes a concept of the speed and is used for display or control of the electric rolling stock. When the speed information of the trailing wheel is used, the output of the PG sensor attached to the trailing wheel is obtained first, and the output of the PG sensor is converted into units of the rotation speed of the trailing wheel. As a unit of the rotation speed of the trailing wheel, "Hz", "rad/s", and the like are used. The rotation speed of the trailing wheel is converted into units of the car speed by using the wheel diameter of the trailing wheel. The car speed is displayed on an operation panel. As a unit of the car speed, "m/s", "km/h", and the like are used.

In addition, there is a case where the car speed is converted into units of the rotation speed of the driving wheel by using the wheel diameter of the driving wheel. As a unit of the rotation speed of the driving wheel, "Hz", "rad/s", and the like are used. In addition, there is a case where the rotation speed of the driving wheel is converted into units of a motor mechanical speed and a motor electrical speed by using the wheel diameter of the driving wheel, a gear ratio, and the number of pairs of motor poles. As units of the motor mechanical speed and the motor electrical speed, "Hz", "rad/s", and the like are used.

As described above, in the display or the control of the electric rolling stock, a plurality of terms having the concept of the speed exists. However, the terms are corresponding to each other one by one, and units are converted between the terms. Therefore, any term may be used as the backup speed.

Figure 4:
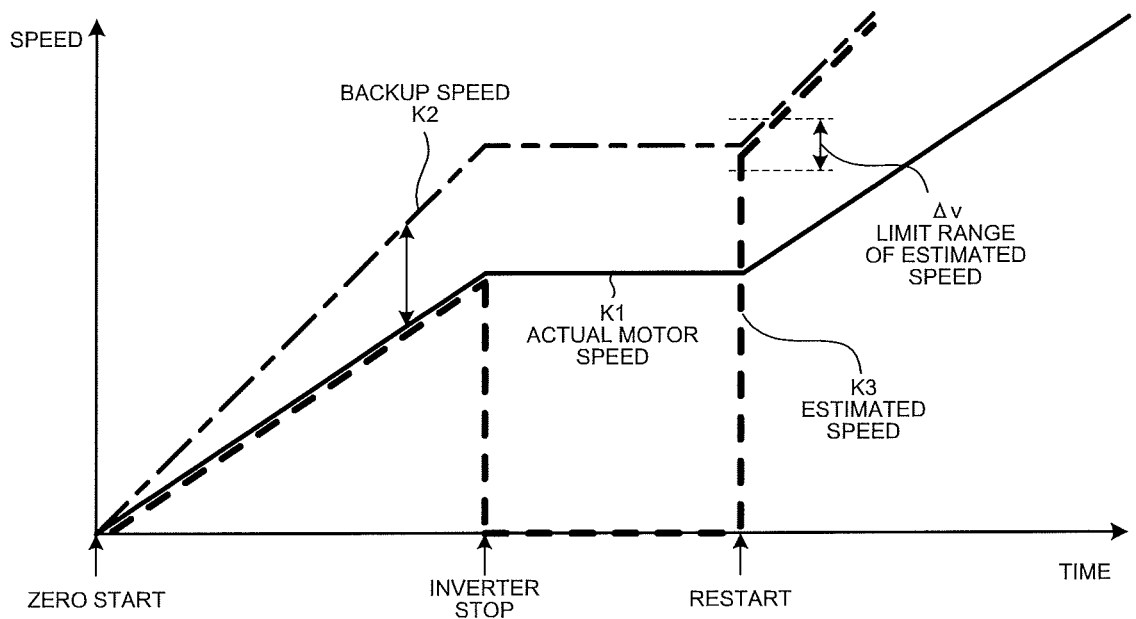
FIG. 4 is a diagram illustrating an operation profile according to the related art in a case where an error between the backup speed and an actual motor speed is caused.
Figure 5:
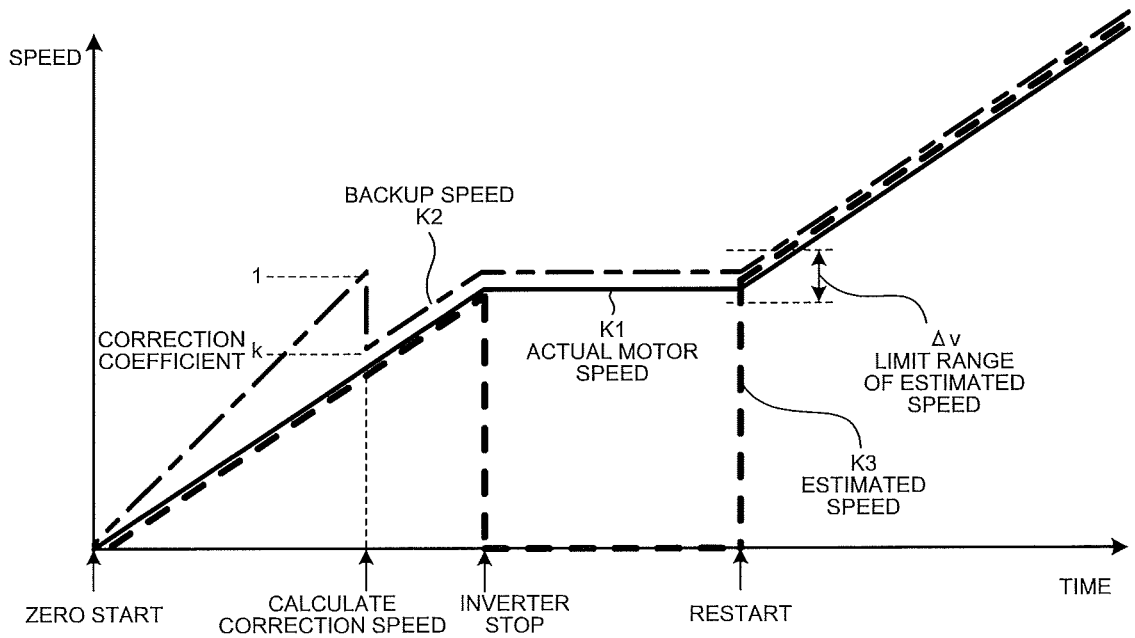
FIG. 5 is a diagram illustrating an operation profile according to the present embodiment in a case where a correction speed is calculated at a certain timing during a power running operation.

Next, an operation of main parts of the electric rolling stock control device according to the present embodiment and an effect of the electric rolling stock control device will be described with reference to FIGS. 4 and 5. FIG. 4 is a diagram to describe current problems and illustrates an operation profile in a case where an error between the backup speed and the actual motor speed exists. FIG. 5 is a diagram to describe the operation of the electric rolling stock control device according to the present embodiment in comparison with FIG. 4. FIG. 5 illustrates an operation profile in a case where the correction speed is calculated at a certain timing during a power running operation. In FIGS. 4 and 5, a curved line K1 indicated by a solid line represents the actual motor speed, a curved line K2 indicated by an alternate long and short dash line represents the backup speed, and a curved line K3 indicated by a dashed line represents an estimated speed.

First, the operation profile illustrated in FIG. 4 will be described. In a power running section from zero start to stop of the inverter, an effect of the wheel diameter error is small in a speed range where the speed is relatively slow, and the error does not affect the initial speed estimation very much. On the other hand, in the power running section, the effect of the wheel diameter error is large in a speed range where the speed is relatively fast, an error between the backup speed and the actual motor speed increases. In a coasting section from the stop of the inverter to restart (also referred to as "re-power running"), a motor torque is controlled to be zero, and the motor current does not flow or is small. Therefore, the speed is not estimated in general. If re-power running is performed in this state, as illustrated in FIG. 4, there has been a problem in that there is a high possibility that the initial speed estimation at the time of restart fails because a large error is caused between the backup speed and the actual motor speed and the limit range of the estimated speed is limited in a range of Δv as illustrated in FIG. 4 by processing by the limiter.

In contrast, in the operation profile illustrated in FIG. 5, in a power running section from the zero start to the stop of the inverter, the calculation processing of the correction speed is performed. The operation profile in FIG. 5 is different from that in FIG. 4 in this point. As illustrated in FIG. 5, if the calculation processing of the correction speed is performed at a certain timing in the power running section, the error between the backup speed and the actual motor speed decreases, and the backup speed is approximated to the actual motor speed. Even if the processing enters the coasting section in this state, the error is small. Therefore, as illustrated in FIG. 5, restart can be performed with a small error, and the limit range of the estimated speed by the limiter processing does not cause adverse effect. The possibility that the initial speed estimation at the time of the restart fails can be greatly reduced. Since the restart can be performed with a small error, the limiter may be omitted to simplify the configuration. In addition, a certain timing may be a timing when the steady speed estimation value $\omega_y$ is greater than a first value. For example, the first value may be set to a value of 40% or 60% of the maximum speed based on the maximum speed of the electric rolling stock in a certain route or a certain traveling section.

In addition, in the operation profile in FIG. 5, the calculation processing of the correction speed is performed in the power running section. However, the calculation processing may be performed in the coasting section. In the coasting section, the car speed is usually controlled to be constant. Therefore, it is expected that a change in the backup speed decreases and calculation accuracy of the correction speed becomes higher. Note that a case where a torque current command is set to zero or a case where an acceleration is zero is substantially synonymous with a case where the car speed is constant. Therefore, such a timing is suitable as a timing to perform the calculation processing.

Especially, in the embodiment in which the speed information managed by an external system, not the information of the car speed sensor, is received as the backup speed, a backup speed update involves a time lag due to a transmission delay. Therefore, if the calculation processing of the correction speed is performed during acceleration, the error of the correction speed may increase. Even in such a case, when the car speed is constant, the correction speed is not affected by the transmission delay. Accordingly, an increase in the error of the correction speed can be avoided.

In a case where the calculation processing of the correction speed is performed in the coasting section, in FIG. 5, the operation of the inverter 1 is stopped when the power running section is shifted to the coasting section. However, the calculation processing of the correction speed may be performed while the operation of the inverter 1 is continued for a short time. Since estimation processing of the steady speed is linked to the operation of the inverter 1, even after the torque command from the electric rolling stock control device to the electric motor 2 has become zero, if the operation of the inverter 1 is continued for a short time, the estimation processing of the steady speed is continued. Therefore, an effect can be obtained that the calculation processing of the correction speed can be performed in a state where the operation of the control system is stable.

Figure 6:
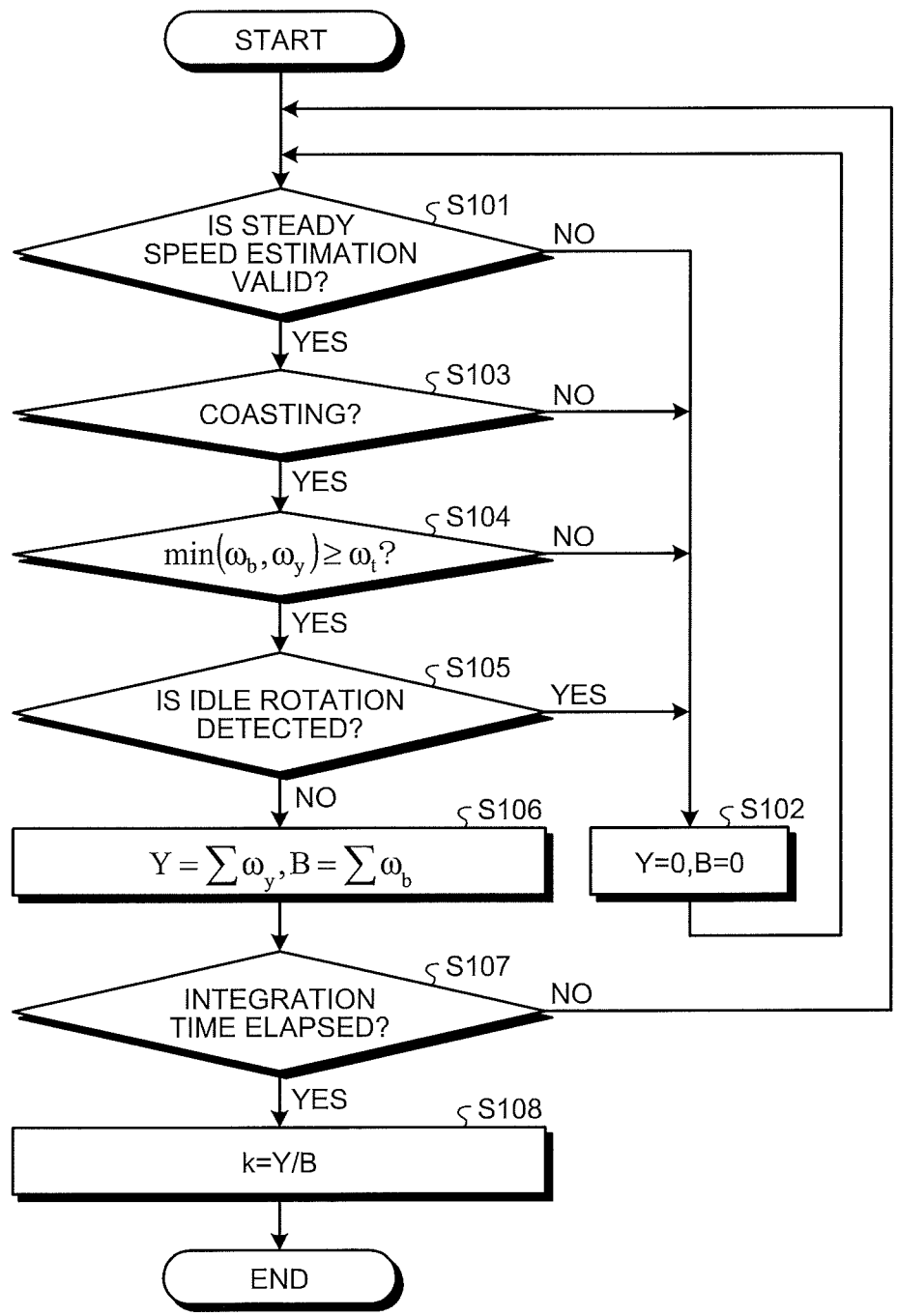
FIG. 6 is a flowchart illustrating a processing flow of correction coefficient calculation in the electric rolling stock control device according to the present embodiment.

Next, a processing flow regarding the calculation of the correction coefficient will be described with reference to FIG. 6. FIG. 6 is a flowchart illustrating the processing flow of the correction coefficient calculation in the electric rolling stock control device according to the present embodiment. There is a degree of freedom regarding a period in which a calculation cycle of the flowchart in FIG. 6 is repeated, and the calculation cycle may be determined according to an update frequency of the correction coefficient and an ability of a CPU to be described later.

In FIG. 6, it is determined in step S101 whether the steady speed estimation is valid. If the steady speed estimation is not valid (step S101, No), the procedure proceeds to step S102. In step S102, both an integral value of the steady speed estimation value $\omega_y$ calculated in processing in step S106 to be described later and an integral value of the backup speed $\omega_b$ are reset (referred to as "reset processing of integral value" below), and the procedure returns to the processing in step S101. On the other hand, if the steady speed estimation is valid (step S101, Yes), the procedure proceeds to step S103.

It is determined in step S103 whether the electric rolling stock is coasting. If the electric rolling stock is not coasting (step S103, No), the procedure proceeds to step S102 to reset the integral values. Then, the procedure returns to the processing in step S101. On the other hand, if the electric rolling stock is coasting (step S103, Yes), the procedure proceeds to step S104.

In step S104, it is determined whether the smaller one of the steady speed estimation value $\omega_y$ and the backup speed $\omega_b$ is larger than or equal to a determination value. In a case where one of the steady speed estimation value $\omega_y$ and the backup speed $\omega_b$ is smaller than the determination value (step S104, No), the procedure proceeds to step S102, and the reset processing of the integral values is performed. Then, the procedure proceeds to the processing in step S101. On the other hand, in a case where both of the steady speed estimation value $\omega_y$ and the backup speed $\omega_b$ are larger than or equal to the determination value (step S104, Yes), the procedure proceeds to step S105.

In step S105, whether idle rotation of the electric rolling stock occurs is detected. If the idle rotation of the electric rolling stock is detected (step S105, Yes), the procedure proceeds to step S102, and the reset processing of the integral values is performed. Then, the procedure returns to the processing in step S101. On the other hand, if the idle rotation of the electric rolling stock is not detected (step S105, No), the procedure proceeds to step S106.

In step S106, the integral value of the steady speed estimation value $\omega_y$ which is a first integral value and the integral value of the backup speed $\omega_b$ which is a second integral value are updated.

In step S107, an elapsed integration time is determined. If the integration time does not reach a desired elapsed time (step S107, No), the procedure returns to the processing in step S101. On the other hand, if the integration time reaches the desired elapsed time (step S107, Yes), the procedure proceeds to step S108, and a ratio between the integral value of the steady speed estimation value $\omega_y$ and the integral value of the backup speed $\omega_b$ is calculated as the correction coefficient k. Then, the processing flow in FIG. 6 is terminated.

According to the processing flow in FIG. 6, since the correction coefficient k is calculated by using the integral value of the steady speed estimation value $\omega_y$ and the integral value of the backup speed $\omega_b$, even when an abnormal value is slipped into the calculation as the steady speed estimation value $\omega_y$ and the backup speed $\omega_b$, the correction coefficient k can be calculated almost without being affected by the abnormal value. Such an effect can be obtained.

In the processing flow in FIG. 6, in a case where the electric rolling stock is not coasting (step S103, No), in a case where one of the steady speed estimation value $\omega_y$ and the backup speed $\omega_b$ is smaller than the determination value (step S104, No), and in a case where the idle rotation of the electric rolling stock is detected (step S105, Yes), the reset processing of the integral value is performed. However, only the data at that time can be discarded instead of the reset processing of the integral value. With such processing, an effect is obtained that the data obtained in the past can be effectively utilized.

Furthermore, in a case where the inverter stops the operation by an operation command during the calculation of the correction coefficient, it is preferable that the correction coefficient be calculated by using only the integral value before stopping the operation of the inverter to update the correction coefficient. In this way, it is possible to update the correction coefficient without wasting the integrated data.

Figure 7:
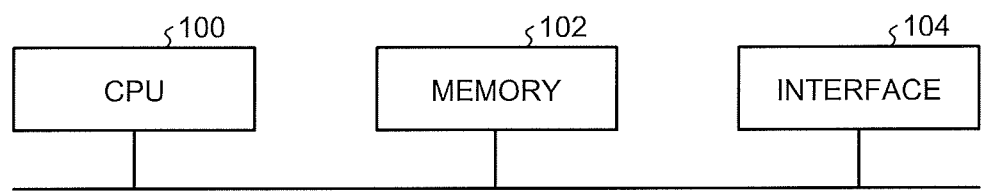
FIG. 7 is a block diagram illustrating an example of a hardware configuration of the electric rolling stock control device according to the present embodiment.

Finally, a hardware configuration of the voltage controlling unit 3 and the speed estimating unit 20 will be described. FIG. 7 is a block diagram illustrating the hardware configuration of the voltage controlling unit 3 and the speed estimating unit 20. In a case where functions of the voltage controlling unit 3 and the speed estimating unit 20 are realized by software, as illustrated in FIG. 7, a configuration can be used which includes a Central Processing Unit (CPU) 100 for performing calculations, a memory 102 for storing a program to be read by the CPU 100, and an interface 104 for inputting and outputting signals. The CPU 100 may be a device referred to as a computing device, a microprocessor, a microcomputer, a processor, a Digital Signal Processor (DSP), or the like. Furthermore, the memory 102 is, for example, a non-volatile or volatile semiconductor memory such as a Random Access Memory (RAM), a Read Only Memory (ROM), a flash memory, an Erasable Programmable ROM (EPROM), and an Electrically EPROM (EEPROM), a magnetic disk, a flexible disk, an optical disk, a compact disk, a mini disk, a Digital Versatile Disc (DVD), a Blu-ray (registered trademark) Disc (BD), and the like.

Specifically, the memory 102 stores programs for executing the functions of the voltage controlling unit 3 and the speed estimating unit 20. The CPU 100 receives information of the motor currents $i_u$, $i_v$, and $i_w$, the d-axis current command $i_d^*$, the q-axis current command $i_q^*$, the d-axis current $i_d$, the q-axis current $i_q$, the angular frequency $\omega_i$, the d-axis voltage command $v_d^*$, the q-axis voltage command $v_q^*$, the backup speed $\omega_b$, and the speed estimation value $\omega_e$ via the interface 104.

In a case where the function of the voltage controlling unit 3 is realized, a program for the voltage controlling unit 3 is stored in the memory 102, and the CPU 100 executes the stored program to realize the function of the voltage controlling unit 3.

In a case where the function of the speed estimating unit 20 is realized, a program for the speed estimating unit 20 is stored in the memory 102, and the CPU 100 executes the stored program to realize the function of the speed estimating unit 20.

Figure 8:
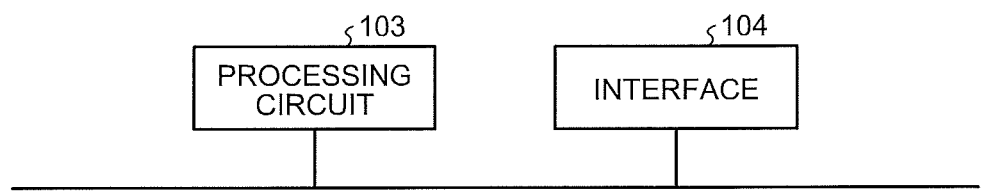
FIG. 8 is a block diagram illustrating another example of the hardware configuration of the electric rolling stock control device according to the present embodiment.

In a case where the functions of the voltage controlling unit 3 and the speed estimating unit 20 are realized with the hardware, the configuration illustrated in FIG. 8 can be used. According to FIG. 8, a processing circuit 103 is provided instead of the CPU 100 and the memory 102 illustrated in FIG. 7. In a case of the configuration illustrated in FIG. 8, the processing circuit 103 performs calculation and receives information of the motor currents $i_u$, $i_v$, and $i_w$, the d-axis current command $i_d^*$, the q-axis current command $i_q^*$, the d-axis current $i_d$, the q-axis current $i_q$, the angular frequency $\omega_i$, the d-axis voltage command $v_d^*$, the q-axis voltage command $v_q^*$, the backup speed $\omega_b$, and the speed estimation value $\omega_e$ via the interface 104.

The processing circuit 103 corresponds to, for example, a single circuit, a composite circuit, a programmed processor, a parallel-programmed processor, an application specific integrated circuit (ASiC), a field-programmable gate array (FPGA), or a combination thereof. By constructing the functions of the voltage controlling unit 3 and the speed estimating unit 20 in the processing circuit 103, the functions of the voltage controlling unit 3 and the speed estimating unit 20 can be realized.

The structures indicated in the above embodiment indicate exemplary contents of the present invention and can be combined with other known technology. Furthermore, the structures indicated in the embodiment can be partially omitted and changed without departing from the scope of the present invention.

REFERENCE SIGNS LIST

1 inverter; 1a switching element; 2 electric motor; 3 voltage controlling unit; 4 current detector; 8 gate driving circuit; 10 gear; 11 overhead contact line; 15 pantagraph; 16 wheel; 17 driving wheel; 18 rail; 20 speed estimating unit; 22 correction speed calculating unit; 31 current command generating unit; 32 slip frequency calculating unit; 33 voltage command calculating unit; 34 integrator; 35 PWM controlling unit; 36 coordinate converter; 100 CPU; 102 memory; 103 processing circuit; 104 interface; 201 initial speed estimating unit; 202 steady speed estimating unit; 203 correction coefficient calculating unit; 204 storage unit; 205 multiplier; 206 limiter; 207 output switch.

The invention claimed is:

1. An electric rolling stock controller to control a power converter to supply power to an electric motor to drive an electric rolling stock using sensorless speed control, the electric rolling stock controller comprising:
   a voltage controller to control an output voltage of the power converter; and
   a speed estimator to calculate a rotation speed estimation value of the electric motor, wherein
   the speed estimator includes:
      a steady speed estimator to output a steady speed estimation value;
      a correction coefficient calculator to calculate a correction coefficient by dividing the steady speed estimation value by a backup speed that is speed information from outside that is stored in a set of electric rolling stocks as inputs; and
      a correction speed calculator to correct the backup speed by multiplying the correction coefficient by the backup speed and calculate a correction speed which is the corrected backup speed.

2. An electric rolling stock controller to control a power converter to supply power to an electric motor to drive an electric rolling stock using sensorless speed control, the electric rolling stock controller comprising:
   a voltage controller to control an output voltage of the power converter; and
   a speed estimator to calculate a rotation speed estimation value of the electric motor, wherein
   the speed estimator includes:
      an initial speed estimator that outputs an initial speed estimation value;
      a steady speed estimator to output a steady speed estimation value;
      a correction coefficient calculator to calculate a correction coefficient by dividing the steady speed estimation value by a backup speed that is speed information from outside that is stored in a set of electric rolling stocks as inputs;
      a correction speed calculator to calculate a correction speed by multiplying the correction coefficient by the backup speed; and
      a limiter to limit the initial speed estimation value within a limit range, wherein
      the speed estimator determines a threshold of the limiter based on the correction speed.

3. The electric rolling stock controller according to claim 2, wherein
   the correction speed calculator calculates the correction speed when the steady speed estimation value is larger than a first value.

4. The electric rolling stock controller according to claim 2, wherein
   in a case where the power converter stops an operation by an operation command during the calculation of the correction coefficient, the correction speed calculator calculates the correction speed by using the correction coefficient obtained by the previous calculation and stored in the memory.

5. The electric rolling stock controller according to claim 2, wherein
   the correction coefficient calculator calculates the correction coefficient by dividing a first integral value obtained by integrating the steady speed estimation value by a second integral value obtained by integrating the backup speed.

6. The electric rolling stock controller according to claim 5, wherein
   in a case where the electric rolling stock is not coasting, the correction coefficient calculator resets the first integral value and the second integral value.

7. The electric rolling stock controller according to claim 5, wherein
   in a case where one of the steady speed estimation value and the backup speed is smaller than a determination value, the correction coefficient calculator resets the first integral value and the second integral value.

8. The electric rolling stock controller according to claim 5, wherein
   in a case where idle rotation of the electric rolling stock occurs, the correction coefficient calculator resets the first integral value and the second integral value.

9. The electric rolling stock controller according to claim 5, wherein
   in a case where an operation command to stop an operation of the power converter is provided during the calculation of the correction coefficient, the correction coefficient calculator updates the correction coefficient based on the calculation result before the power converter stops the operation.

10. The electric rolling stock controller according to claim 2, wherein
    when a state of the electric rolling stock is shifted from a power running state to a coasting state, the correction speed calculator calculates the correction speed as continuing to operate the power converter even after a torque command to the electric motor has become zero.

11. An electric rolling stock controller to control a power converter to supply power to an electric motor to drive an electric rolling stock using sensorless speed control, the electric rolling stock controller comprising:

a voltage controller to control an output voltage of the power converter; and
a speed estimator to calculate a rotation speed estimation value of the electric motor, wherein
the speed estimator includes:
 a steady speed estimator to output a steady speed estimation value;
 a correction coefficient calculator to calculate a correction coefficient based on the steady speed estimation value and a backup speed that is speed information from outside that is stored in a set of electric rolling stocks as inputs; and
 a correction speed calculator to calculate a correction speed by multiplying the correction coefficient by the backup speed, wherein
 the correction coefficient calculator calculates the correction coefficient by dividing a first integral value obtained by integrating the steady speed estimation value by a second integral value obtained by integrating the backup speed.

* * * * *